(12) United States Patent
Matsunawa

(10) Patent No.: US 12,013,263 B2
(45) Date of Patent: Jun. 18, 2024

(54) RESOLVER

(71) Applicant: MABUCHI MOTOR CO., LTD., Chiba (JP)

(72) Inventor: Akira Matsunawa, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/256,426

(22) PCT Filed: Dec. 10, 2021

(86) PCT No.: PCT/JP2021/045688
§ 371 (c)(1),
(2) Date: Jun. 8, 2023

(87) PCT Pub. No.: WO2022/124416
PCT Pub. Date: Jun. 16, 2022

(65) Prior Publication Data
US 2024/0035859 A1    Feb. 1, 2024

(30) Foreign Application Priority Data
Dec. 11, 2020   (JP) .................................. 2020-205916

(51) Int. Cl.
*G01D 5/20* (2006.01)
*G01B 7/30* (2006.01)

(52) U.S. Cl.
CPC ............. *G01D 5/2046* (2013.01); *G01B 7/30* (2013.01)

(58) Field of Classification Search
CPC .................... G01D 5/2046; G01B 7/30
See application file for complete search history.

(56) References Cited

U.S. PATENT DOCUMENTS

| 6,628,038 B1 | 9/2003 | Shikayama et al. |
| 11,592,319 B2 * | 2/2023 | Ausserlechner ..... G01D 5/2053 |

(Continued)

FOREIGN PATENT DOCUMENTS

| CN | 1339101 A | 3/2002 |
| DE | 69930643 T2 | 8/2006 |
| EP | 1152223 A1 | 11/2001 |

(Continued)

OTHER PUBLICATIONS

International Search Report in PCT Application No. PCT/JP2021/045688 dated Mar. 1, 2022, 5pp.

(Continued)

*Primary Examiner* — Reena Aurora
(74) *Attorney, Agent, or Firm* — HAUPTMAN HAM, LLP

(57) ABSTRACT

A resolver includes: a sine exciting coil and a cosine exciting coil; a detecting coil that is provided to a rotor and is placed facing the sine exciting coil and the cosine exciting coil; an exciting coil forming a closed circuit, together with the detecting coil, in the rotor; and a sine detecting coil and a cosine detecting coil that are provided to a stator, are placed facing the exciting coil, and transmit alternating current signals that are 90 electrical degrees apart in phase. The multiplication factor of angle of the sine detecting coil, the cosine detecting coil, and the exciting coil is different from the multiplication factor of angle of the sine exciting coil, the cosine exciting coil, and the detecting coil.

5 Claims, 5 Drawing Sheets

(56) References Cited

U.S. PATENT DOCUMENTS

2010/0321007 A1   12/2010  Fukuda et al.
2019/0044418 A1*   2/2019  Matsunawa .......... H02K 11/225

FOREIGN PATENT DOCUMENTS

| JP | H11325964 A  | 11/1999 |
| JP | 2011047672 A |  3/2011 |
| JP | 2014025757 A |  2/2014 |
| JP | 2017090431 A |  5/2017 |
| JP | 2020003230 A |  1/2020 |
| KR |  100611630 B1|  8/2006 |

OTHER PUBLICATIONS

Written Opinion in PCT Application No. PCT/JP2021/045688 dated Mar. 1, 2022, 7pp.

* cited by examiner

RESOLVER

RELATED APPLICATIONS

The present application is a National Phase of International Application Number PCT/JP2021/045688 filed Dec. 10, 2021, which claims the benefit of priority from Japanese Patent Application No. 2020-205916, filed on Dec. 11, 2020.

TECHNICAL FIELD

The present invention relates to a resolver that detects the angle of rotation of a rotor relative to a stator.

BACKGROUND ART

A resolver that detects the angle of rotation of a rotor relative to a stator is conventionally known in which alternating current voltages that are 90 electrical degrees apart in phase are applied to two exciting coils placed in the stator and a detecting coil placed in the rotor acquires a signal obtained by adding the two alternating current voltages. Such a resolver is called a two-phase excitation/single-phase output resolver. A phase difference in accordance with the angle of rotation of the rotor occurs with reference to the alternating current voltages applied to the exciting coils, in the signal obtained in the detecting coil. Therefore, the angle of rotation of the rotor can be obtained on the basis of the phase difference (refer to JP-A-2017-90431). Moreover, a resolver is also known in which an alternating current voltage is applied to one exciting coil placed in the stator and two detecting coils placed in the rotor acquire signals. Such a resolver is called a single-phase excitation/two-phase output resolver (refer to JP-A-2014-25757).

CITATION LIST

Patent Literature

Patent Literature 1: JP-A-2017-90431
Patent Literature 2: JP-A-2014-25757

DISCLOSURE OF THE INVENTION

Problems to be Solved by the Invention

In the resolver described in Patent Literature 1, the signal obtained in the detecting coil is transmitted from the rotor to the stator via antennal coils. For example, in the technology described in Patent Literature 1, the rotor is provided with a primary winding 45 connected to a detecting winding 42 (a detecting coil), and the stator is provided with a secondary winding 49 facing the primary winding 45. These windings 45 and 49 function as the antenna coils. On the other hand, the antenna coils are placed at positions that do not interfere with the exciting coils and the detecting coil. Therefore, there is a problem that the placement tends to become an obstacle to a reduction in the size of the resolver.

Moreover, it is also conceivable that a resolver having a low multiplication factor of angle and a resolver having a high multiplication factor of angle are combined as described in Patent Literature 2 to increase the angular resolution. However, in this case, the numbers of exciting coils, detecting coils, and antenna coils increase, and the apparatus becomes larger in size and more complicated. Moreover, it is necessary to input an excitation signal into each of the resolver having the low multiplication factor of angle and the resolver having the high multiplication factor of angle. Therefore, exciting circuits of two systems need to be provided. Hence, the number of components increases and the size of the apparatus increases further.

One object of the invention has been devised in view of the above problem, and is to provide a resolver that can increase the angular resolution and has a simple configuration that facilitates effective use of space. Note that the invention is not limited to this object, and exerting operations and effects derived from configurations revealed in "DESCRIPTION OF PREFERRED EMBODIMENTS" described below, the operations and effects being unattainable by the known technology, is also another object of the invention.

Solutions to the Problems

A resolver of the disclosure is a resolver that detects the angle of rotation of a rotor relative to a stator, and includes: a sine exciting coil and a cosine exciting coil, the coils being provided to the stator and configured to transmit alternating current signals that are 90 electrical degrees apart in phase; a detecting coil provided to the rotor, the detecting coil being placed facing the sine exciting coil and the cosine exciting coil; an exciting coil forming a closed circuit, together with the detecting coil, in the rotor; and a sine detecting coil and a cosine detecting coil, the coils being provided to the stator, placed facing the exciting coil, and configured to transmit alternating current signals that are 90 electrical degrees apart in phase. Moreover, the multiplication factor of angle of the sine detecting coil, the cosine detecting coil, and the exciting coil is different from the multiplication factor of angle of the sine exciting coil, the cosine exciting coil, and the detecting coil.

Effects of the Invention

According to a resolver of the disclosure, it is possible to provide a resolver that can increase the angular resolution and has a simple configuration that facilitates effective use of space.

DESCRIPTION OF PREFERRED EMBODIMENTS

[1. Configuration]
[1-1. Overview]

Figure 1:
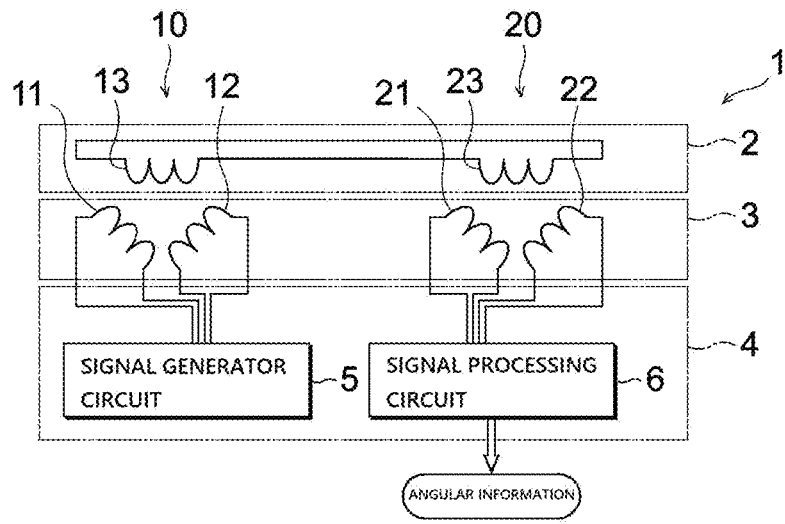
FIG. 1 is a schematic diagram illustrating the structure of a resolver as an embodiment.

FIG. 1 is a schematic diagram illustrating the structure of a resolver 1 as an embodiment. The resolver 1 is a modulated wave resolver that inputs an amplitude modulated alternating current signal and detects the angle of rotation from a signal of which the phase has been modulated by use of the alternating current signal. The resolver 1 includes a rotor 2 (a rotor), a stator 3 (a stator), and a control device 4. The rotor 2 is a disc-shaped member that is pivotally supported in such a manner as to be rotatable relative to the stator 3. Moreover, the stator 3 is a disc-shaped member that is fixed to an unillustrated casing. Each of the rotor 2 and the stator 3 is provided with a plurality of sheet coils formed in a sheet shape. In the embodiment, an example is illustrated in which a coil is formed on a flexible circuit board (FPC, Flexible Printed Circuits). However, a rigid board such as a glass epoxy board being an epoxy glass cloth laminate may be used.

The control device 4 computes and outputs the angle of rotation of the rotor 2 relative to the stator 3. A signal generator circuit 5 that generates alternating current signals that are supplied to the sheet coils, and a signal processing circuit 6 that outputs angular information corresponding to the angle of rotation on the basis of output signals returned from the sheet coils are incorporated in the control device 4. The alternating current signals generated in the signal generator circuit 5 are transmitted by electromagnetic induction from the stator 3 to the rotor 2 and then returned from the rotor 2 to the stator 3 to be inputted into the signal processing circuit 6. The angle of rotation of the rotor 2 relative to the stator 3 is grasped on the basis of the signals inputted in the signal processing circuit 6.

The rotor 2 and the stator 3 of the resolver 1 illustrated in FIG. 1 are provided with a first coil group 10 and a second coil group 20. The first coil group 10 is a coil group that is responsible for transmitting information from the rotor 2 to the stator 3, and includes exciting and detecting coils having a multiplication factor of angle of nX. The exciting and detecting coils of the first coil group 10 are multipole coils. Contrarily, the second coil group 20 is a coil group that is responsible for transmitting information from the stator 3 to the rotor 2, and includes exciting and detecting coils that are different in the multiplication factor of angle from the first coil group 10. The multiplication factor of angle of the exciting and detecting coils included in the second coil group 20 is, for example, 1×.

The first coil group 10 is provided with a sine exciting coil 11, a cosine exciting coil 12, and a detecting coil 13. The sine exciting coil 11 and the cosine exciting coil 12 are sheet-shaped coils for inducing a voltage responsive to the angle of the rotor in the detecting coil 13 of the rotor 2, and are provided to the stator 3. Alternating current signals that are 90 electrical degrees apart in phase are inputted into these exciting coils 11 and 12. The alternating current signals are generated in the signal generator circuit 5, and supplied to the sine exciting coil 11 and the cosine exciting coil 12, respectively.

Specific examples of the alternating current signal include a modulated wave that has been modulated in such a manner as to periodically vary the amplitude of a high-frequency signal at, for example, several dozen kilohertz to several megahertz. Moreover, the detecting coil 13 is provided to the rotor 2, and is a sheet-shaped coil placed facing the sine exciting coil 11 and the cosine exciting coil 12. In the detecting coil 13, an alternating current voltage signal is induced by interlinkage of magnetic flux generated by exciting the sine exciting coil 11 and the cosine exciting coil 12.

The second coil group 20 is provided with a sine detecting coil 21, a cosine detecting coil 22, and an exciting coil 23. The exciting coil 23 is a sheet-shaped coil that forms a closed circuit, together with the detecting coil 13, in the rotor 2. As illustrated in FIG. 1, two ends of the exciting coil 23 are connected to two ends of the detecting coil 13. The induced voltage generated in the detecting coil 13 acts on the exciting coil 23. Moreover, the sine detecting coil 21 and the cosine detecting coil 22 are sheet-shaped coils in which an alternating current voltage signal responsive to the angle of the rotor is inducted in response to a magnetic flux generated on the exciting coil 23 of the rotor 2, and is provided to the stator 3. The alternating current signals that are 90 electrical degrees apart in phase are transmitted to theses detecting coils 21 and 22. The alternating current signals obtained in the detecting coils 21 and 22 are transmitted to the signal processing circuit 6 to calculate the angle of rotation of the rotor 2 relative to the stator 3.

Figure 2:
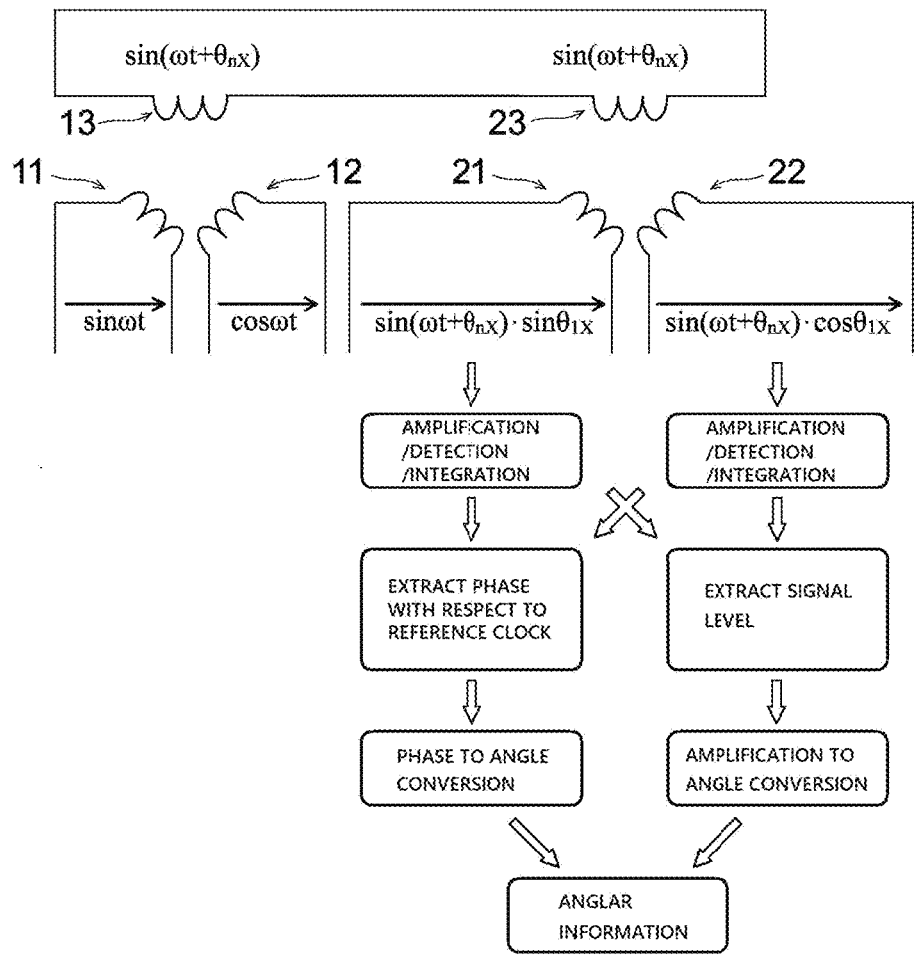
FIG. 2 is a schematic diagram for explaining a method for calculating angular information in the resolver illustrated in FIG. 1.

As illustrated in FIG. 2, let a voltage waveform to be inputted into the sine exciting coil 11 be sin ωt. ω represents the angular frequency [rad/s] (angular velocity) of an oscillating voltage. t represents time [s]. A voltage waveform to be inputted into the cosine exciting coil 12 is at 90 electrical degrees (2πc[rad]/n) displaced in phase from sin ωt, and therefore can be expressed as, for example, cos ωt. On the other hand, a voltage waveform induced in the detecting coil 13 by the magnetic flux generated on these exciting coils 11 and 12 can be expressed as $\sin(\omega t + \theta_{nx})$.

The angle $\theta_{nx}$ is a parameter [rad] corresponding to an actual angle displacement between the sine exciting coil 11 and the cosine exciting coil 12, and the detecting coil 13. The multiplication factor of angle of these coils 11 to 13 is nX. Therefore, the relative positions of the sine exciting coil 11 and the cosine exciting coil 12, and the detecting coil 13 are substantially the same n times during one rotation of the rotor 2 relative to the stator 3. The angle $\theta_{nx}$ is an angle representing the position of the angle of rotation of the rotor 2 (high-resolution position information) within a range of one cycle of the relative position that changes repeatedly (within a range of 2π[rad]/n).

Moreover, a voltage waveform to be transmitted to the exciting coil 23 is the same as the detecting coil 13, and can be expressed as $\sin(\omega t + \theta_{nx})$. On the other hand, a voltage waveform induced in the sine detecting coil 21 by the magnetic flux generated on the exciting coil 23 can be expressed as $\sin(\omega t + \theta_{nx}) \cdot \sin \theta_{1x}$. Moreover, a voltage waveform to be induced in the cosine detecting coil 22 can be expressed as $\sin(\omega t + \theta_{nx}) \cdot \cos \theta_{1x}$. The angle $\theta_{1x}$ is a parameter [rad] corresponding to an actual angle displacement between the sine detecting coil 21 and the cosine detecting coil 22, and the detecting coil 13. The multiplication factor of angle of these coils 21 to 23 is 1×. Therefore, the angle $\theta_{1x}$ is an angle representing the position of the angle of rotation of the rotor 2 within a range of one rotation of the rotor 2 (within the range of 2π[rad]). Note that as described above, the high-resolution position information of the rotor 2 is given by the angle $\theta_{nx}$. Therefore, the accuracy obtained for the angle $\theta_{1x}$ is simply required to be accurate at a level that allows grasping in which section (position) the angle of rotation of the rotor 2 is present among sections obtained by dividing the range of 2πc[rad] into n equal sections.

The voltage waveform induced in each of the sine detecting coil 21 and the cosine detecting coil 22 is inputted into the signal processing circuit 6. Each of the voltage waveforms is amplified via an amplifier circuit in the signal processing circuit 6. The each of the voltage waveforms undergoes a synchronous detection process via a detector circuit, and a value corresponding to an integral of each of the voltages over a predetermined interval (a magnetic flux amount equivalent value) is calculated via an integrator circuit. One of the integrals calculated is used to extract a phase with respect to a reference clock, and the other integral is used to extract a signal level (amplitude). The former phase information is converted into information on the angle $\theta_{nx}$. Moreover, the latter signal level information is converted into information on the angle $\theta_{1x}$. The angle of rotation of the rotor 2 relative to the stator 3 is obtained on the basis of these pieces of the angular information.

[1-2. Coils in Stator]

Figure 3:
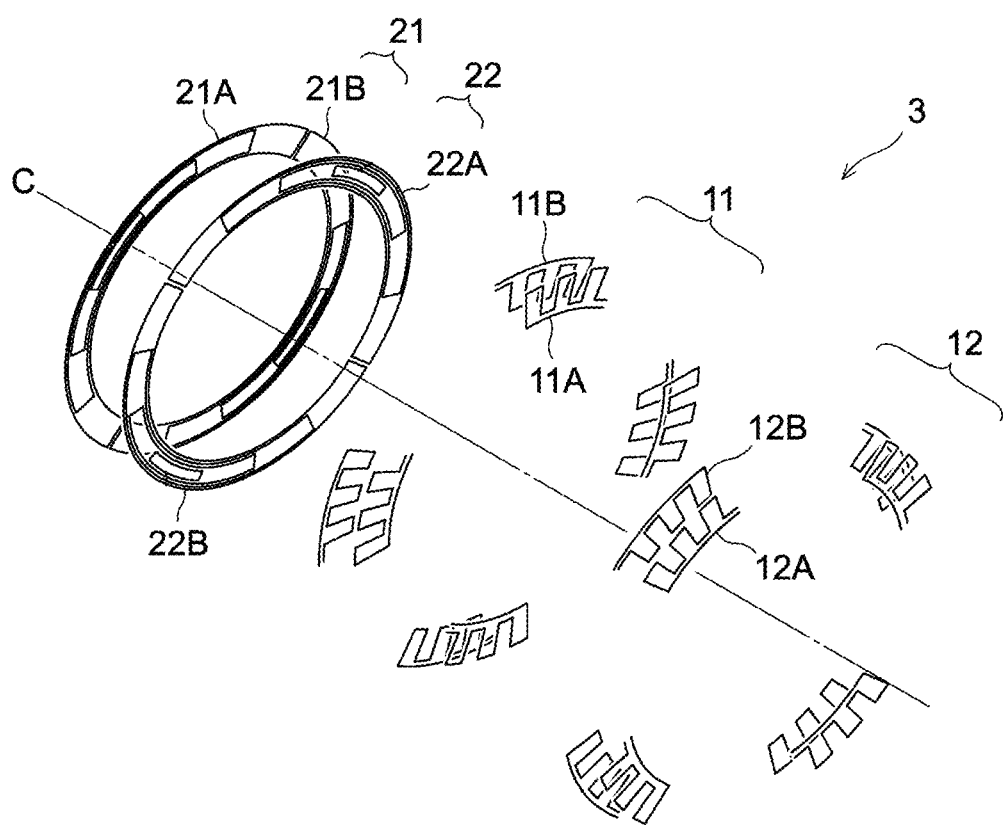
FIG. 3 is an exploded perspective view illustrative of a specific circuit structure of a stator.
Figure 4:
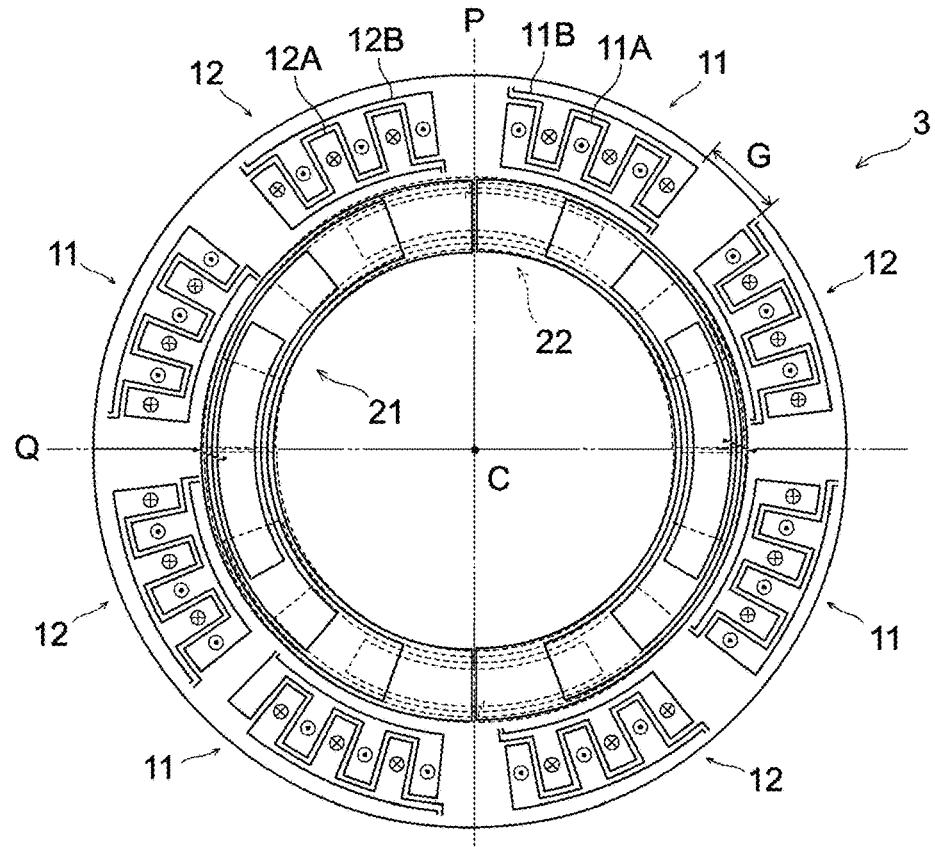
FIG. 4 is a schematic diagram of the circuit structure illustrated in FIG. 3 as viewed from the front.

FIG. 3 is an exploded perspective view illustrative of a specific circuit structure of the stator 3. FIG. 4 is a schematic diagram of the circuit structure as viewed from the front. On an opposing surface between the rotor 2 and the stator 3, the stator 3 is provided with the sine exciting coil 11, the cosine exciting coil 12, the sine detecting coil 21, and the cosine detecting coil 22. The sine exciting coil 11 and the cosine exciting coil 12 are placed alternately and adjacently in a circumferential direction at positions facing the detecting coil 13 of the rotor 2. Moreover, the sine detecting coil 21 and the cosine detecting coil 22 are each placed in a ring shape at a position facing the exciting coil 23 of the rotor 2.

Figure 5:
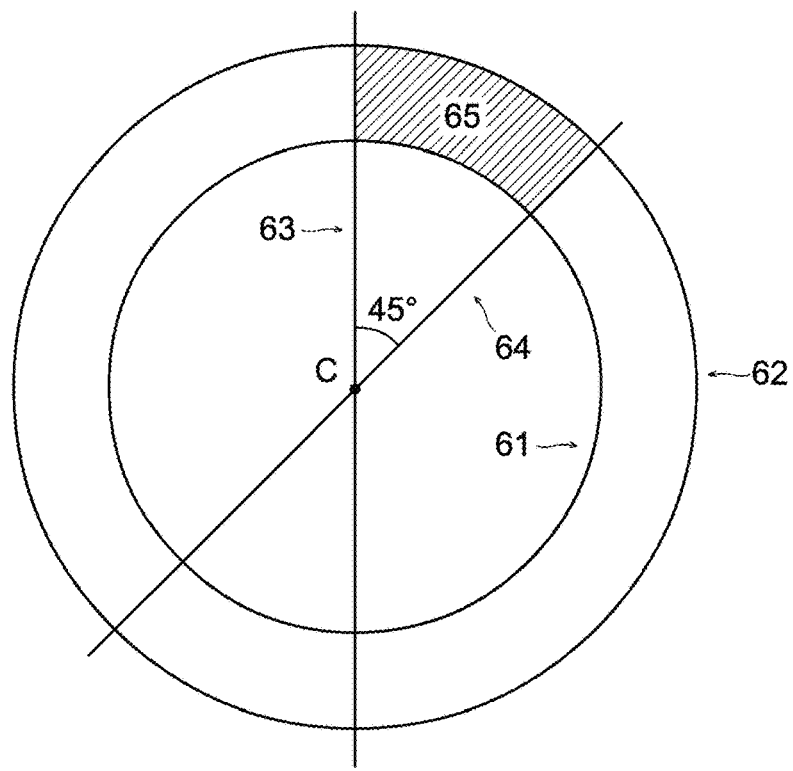
FIG. 5 is a schematic diagram for explaining a partial annular area.

Areas in each of which the sine exciting coil 11 and the cosine exciting coil 12 are placed are each formed in a shape matching a partial annular area 65 illustrated in FIG. 5. The partial annular area 65 is an area surrounded by an inner circle 61 and an outer circle 62, which are centered on a rotation axis C of the rotor 2, and two straight lines 63 and 64 passing the rotation axis C. In the example illustrated in FIG. 5, the angle formed by the two straight lines 63 and 64 is 45 degrees, and eight partial annular areas 65 can be adjacently placed in the circumferential direction. If it is desired to adjacently place m partial annular areas 65, the angle formed by the two straight lines 63 and 64 is simply required to be set at 360 degrees/m.

In the embodiment, in an area on the opposing surface between the rotor 2 and the stator 3, the area being equally divided into an even number (eight in FIG. 4), the sine exciting coils 11 and the cosine exciting coils 12 are placed alternately and adjacently. Consequently, the number of the sine exciting coils 11 is equal to the number of the cosine exciting coils 12. Note that the sine exciting coils 11 and the cosine exciting coils 12 may be routed in such a manner as to have rotational symmetry about the rotation axis C of the rotor 2 in the same plane on the precondition that the phases of the coils 11 and 12 agree with each other with reference to the pole pitch of the rotor 2. In the example illustrated in FIG. 4, in terms of the layout of the conductors, assuming pairs of one sine exciting coil 11 and one cosine exciting coil 12, which are adjacent to each other, they are formed in such a manner as to have four-fold rotational symmetry about the rotation axis C.

A supplemental description of the number of pairs of the sine exciting coils 11 and the cosine exciting coils 12 (the number of pairs) is provided. If the number of pairs is set at one or two, the left half and the right half of the annular area where the exciting coils 11 and 12 are placed in FIG. 4 tend to be unbalanced, and robustness as a detector decreases. Therefore, the number of pairs is preferably three or more. Moreover, also if the number of pairs is set at an odd number, the numbers of the sine exciting coils 11 and the cosine exciting coils 12 result in being different between on the left half and on the right half. Therefore, the number of pairs is more preferably an even number. However, if the number of pairs is increased too much, large space is required for gaps between the exciting coils 11 and 12. As a result, it is disadvantage especially for the resolver 1 with a small diameter. Considering these points, the number of pairs of the sine exciting coils 11 and the cosine exciting coils 12, which are illustrated in FIG. 4, is set at four.

Note that the sine exciting coil 11 and the cosine exciting coil 12 may be displaced at positions where the phases are the same in terms of the electrical angle. For example, the exciting coils 11 and 12 may be displaced from rotationally symmetric positions to positions that are 360 electrical degrees (that is, a mechanical angle equivalent to one magnetic pole pair) apart in the circumferential direction. In this manner, the positions of the exciting coils 11 and 12 are moved N cycles in terms of the electrical angle (more specifically, one or two cycles in terms of the electrical angle) in the circumferential direction. A gap G (refer to FIG. 4) between the exciting coils 11 and 12 can be increased, and it is easier to route a lead from the inner peripheral side through the gap G in the same plane. The dimension of the gap G is set at equal to or greater than a dimension equivalent to at least 180 electrical degrees (that is, a mechanical angle equivalent to 0.5 magnetic pole pair, equivalent to one magnetic pole). Note that the exciting coils 11 and 12 are not necessarily placed equally.

Moreover, the circumferential length of the exciting coil 11 or 12 included in one partial annular area 65 illustrated in FIG. 5 is simply required to be a length that allows the formation of one magnetic pole pair (the north and south poles) at a minimum. If the number of the partial annular areas 65 is m, the number of pairs of the sine exciting coils 11 and the cosine exciting coils 12 can be expressed as m/2. Therefore, the number of magnetic pole pairs included in one exciting coil 11 or 12 is a number obtained by dividing a value n of the multiplication factor of angle by the number of pairs (2n/m) at a maximum, and is one at a minimum.

The sine exciting coil 11 is formed in a shape obtained by connecting an outward coil 11A and a return coil 11B. The direction of current to be inputted into the outward coil 11A is set in a direction opposite to the direction of current to be inputted into the return coil 11B. Therefore, when the direction of the magnetic pole generated in the outward coil 11A is, for example, a direction into the page in FIG. 4, the direction of the magnetic pole generated in the return coil 11B is a direction out of the page in FIG. 4. The outward coil 11A and the return coil 11B are placed in the same plane in such a partial annular area 65 as illustrated in FIG. 5 in such a manner as to not overlap with each other. At least a part of the outward coil 11A includes a coil of a wave shape.

The term "wave shape" referred to herein includes a repetitive shape in which a radial distance changes at regular intervals according to the change of the angle of deviation in a polar coordinate plane that is perpendicular to the rotation axis C of the rotor 2 and has the rotation axis C as origin. Moreover, the term "wave shape" includes a shape that imitates the repetitive shape, and a shape similar to the repetitive shape. The term "wave shape" referred to herein includes a shape obtained by altering the repetitive shape to the extent that does not compromise the performance of the resolver 1 although it is not completely the same as the repetitive shape, and a shape that can be said to be substantially equal to the repetitive shape. Specific examples of "wave shape" include a rectangular wave shape, a sine wave shape, and a triangular wave shape. Moreover, the term "wave shape" also includes wave shapes obtained by rounding these shapes (shapes obtained by blunting the corners of a rectangle and a triangle).

The outward coil 11A illustrated in FIG. 4 is formed in a shape obtained by placing a rectangular wave along the circumference of a circle coaxial with the rotation axis C of the rotor 2 and routing a conductor along the inner perimeter of the rectangular wave. Put another way, the outward coil 11A is formed in a shape obtained by routing a conductor in such a manner as to form the outline of a gear placed coaxially with the rotation axis C of the rotor 2 and routing the conductor along the inner perimeter of the gear. In other words, the outward coil 11A is formed in the shape of a comb with the teeth formed on the outer surface of the comb, and formed in a shape obtained by routing a conductor in such a manner as to form the outline of the comb with the teeth extending from an arc on the inner circle 61 illustrated in FIG. 5 toward an arc on the outer circle 62.

Contrarily, the return coil 11B is formed in a shape obtained by placing a rectangular wave along the circumference of a circle coaxial with the rotation axis C of the rotor 2 and routing a conductor along the outer perimeter of the rectangular wave. Put another way, the return coil 11B is formed in a shape obtained by routing a conductor in such a manner as to form the outline of a gear placed coaxially with the rotation axis C of the rotor 2 and routing the conductor along the outer perimeter of the gear. In other words, the return coil 11B is formed in the shape of a comb with the teeth formed on the inner surface of the comb, and formed in a shape obtained by routing a conductor in such a manner as to form the outline of the comb with the teeth extending from the arc on the outer circle 62 illustrated in FIG. 5 toward the arc on the inner circle 61.

As in the sine exciting coil 11, the cosine exciting coil 12 is formed in a shape obtained by connecting an outward coil 12A and a return coil 12B in such a manner as to not overlap with each other. As illustrated in FIG. 4, the outward coil 12A is formed in a shape obtained by routing a conductor in such a manner as to form the outline of a comb with the teeth extending outward from the arc. Moreover, the return coil 12B is formed in a shape obtained by routing a conductor in such a manner as to form the outline of a comb with the teeth extending inward from the arc.

Note that in the exciting coils 11 and 12 having such comb shapes as illustrated in FIG. 4, the outward coils 11A and 12A placed on the inner side are slightly different in shape from the return coils 11B and 12B placed on the outer side. Therefore, the strength of a magnetic field generated in each coil also results in being slightly different, which is one of causes that generate an angle error. On the other hand, as illustrated in FIG. 4, the layout of the directions of the magnetic poles in the sine exciting coil 11 and the cosine exciting coil 12 (the layout of the directions of the magnetic flux generated by an alternating current excitation signal at a given point in time) is formed in such a manner as to be reversed in alternate groups of the coils 11 and 12. The layout is described, using FIGS. 8A and 8B.

Figure 8A:
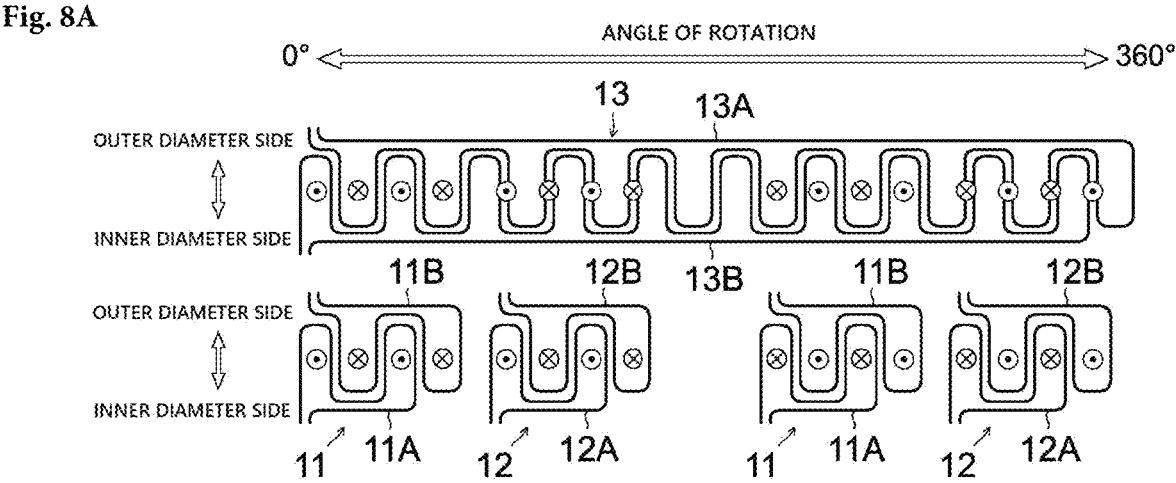
FIGS. 8A and 8B are schematic diagrams illustrating a correspondence between a detecting coil and exciting coils.
Figure 8B:
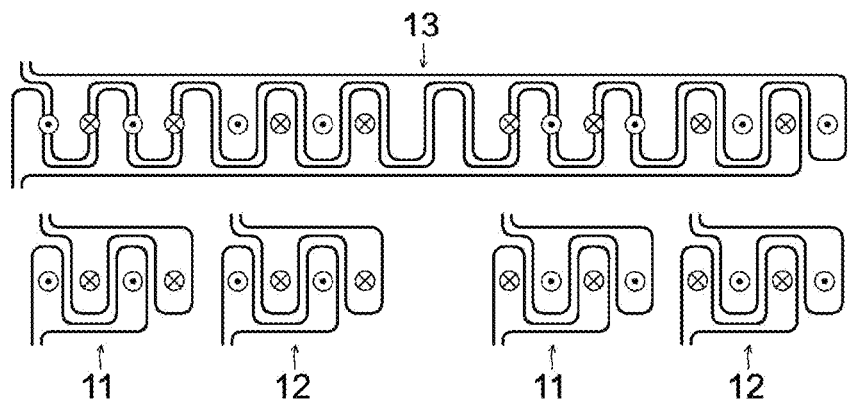

FIGS. 8A and 8B are schematic diagrams for explaining the relationship between the exciting coils 11 and 12 and the detecting coil 13 of the rotor 2. Both of the number of the sine exciting coils 11 and the number of the cosine exciting coils 12 is four in reality as illustrated in FIG. 4. However, two sine exciting coils 11 and two cosine exciting coils 12 are illustrated, omitting the remaining coils in FIGS. 8A and 8B. The left-and-right direction in the drawings corresponds to the direction of the angle of rotation (the angle of deviation), and the up-and-down direction in the drawings corresponds to the radial direction (the top is the outer diameter side and the bottom is the inner diameter side).

The same numbers of rotationally symmetric coils that are different in the direction of magnetic flux due to excitation on the precondition that the phases of the coils 11 and 12 agree with each other with reference to the pole pitch of the rotor 2 are included in each of the sine exciting coils 11 and the cosine exciting coils 12. For example, focusing on the left sine exciting coil 11 in FIG. 8A, the direction of magnetic flux generated by exciting the outward coil 11A at a given point in time is assumed to be the direction into the page. On the other hand, the return coil 11A of the right sine exciting coil 11 in FIG. 8A is formed in such a manner that the direction of magnetic flux generated by exciting the return coil 11A at a given point in time is assumed to be the direction out of the page. In short, the return coils 11A of the sine exciting coils 11 are formed in such a manner as to have rotational symmetry and differ in the direction of magnetic flux by excitation from each other on the precondition that the phases of the coils 11 and 12 agree with each other with reference to the pole pitch of the rotor 2.

The same applies to the return coils 11B of the sine exciting coils 11. The return coil 11B of the left sine exciting coil 11 in FIG. 8A generate a magnetic flux in the direction out of the page at a given point in time. On the other hand, the return coil 11B of the right sine exciting coil 11 in FIG. 8A generates a magnetic flux in the direction into the page at a given point in time. If the magnetic flux generated on the sine exciting coil 11 is superimposed on the detecting coil 13, a difference between a magnetic field acting on an outward coil 13A and a magnetic field acting on a return coil 13B is reduced. Therefore, the magnetic flux difference due to the coil shape (the orientation of the comb) in the same phase is averaged, and the angle detection accuracy of the resolver 1 is further increased.

Note that the peak position of the magnetic flux generated on the cosine exciting coil 12 is displaced 90 electrical degrees from the peak position of the magnetic flux generated on the sine exciting coil 11. Therefore, in the state illustrated in FIG. 8A, the magnetic flux generated on the cosine exciting coil 12 is not linked with the detecting coil 13.

FIG. 8B is a schematic diagram representing a state where the rotor 2 has rotated 90 electrical degrees from the state illustrated in FIG. 8A. Not only the sine exciting coil 11 but also the cosine exciting coil 12 includes the same numbers of rotationally symmetric coils that are different from each other in the direction of magnetic flux by excitation on the precondition that the phases of the coils 11 and 12 agree with each other with reference to the pole pitch of the rotor 2. With such a structure, the difference between the magnetic field acting on the outward coil 13A and the magnetic field acting on the return coil 13B in the magnetic fields generated on the cosine exciting coils 12 is reduced, and the magnetic flux difference due to the coil shape (the orientation of the comb) is averaged. Therefore, the angle detection accuracy of the resolver 1 is further increased.

In FIG. 4, the sine detecting coil 21 is a coil placed inside the sine exciting coil 11 and the cosine exciting coil 12, and is formed in a shape obtained by connecting an outward coil 21A and a return coil 21B (refer to FIG. 3). The outward coil 21A is formed in a shape obtained by routing a conductor in a spiral form in one of annular areas obtained by dividing a plane where the sine detecting coil 21 is routed into two with a straight line P passing the rotation axis C of the rotor 2. Moreover, the return coil 21B is formed in a shape obtained by routing a conductor in a spiral form in the other annular area obtained by the division into two with the straight line P. The outward coil 21A functions in such a manner as to generate one of a magnetic pole pair, and the return coil 21B functions in such a manner as to generate the other of the magnetic pole pair.

The cosine detecting coil 22 has a structure similar to that of the sine detecting coil 21. The cosine detecting coil 22 is formed in, for example, a shape obtained by connecting an outward coil 22A and a return coil 22B (refer to FIG. 3). The outward coil 22A is formed in a shape obtained by routing a conductor in a spiral form in one of annular areas obtained by dividing a plane where the cosine detecting coil 22 is routed into two with a straight line Q. Moreover, the return coil 22B is formed in a shape obtained by routing a conductor in a spiral form in the other annular area obtained by the division into two with the straight line Q.

The numbers of turns of and the winding forms of the sine detecting coil 21 and the cosine detecting coil 22 are set in such a manner that the strength of magnetic fields generated on the detecting coils 21 and 22 changes in a sine wave shape as the angle of rotation of the rotor 2 relative to the stator 3 changes. For example, the number of turns is set in such a manner as to change in stages as the angle of deviation changes in the polar coordinate plane that is perpendicular to the rotation axis C of the rotor 2 and has the rotation axis C as origin. In the example illustrated in FIG. 4, the coil winding form is set in such a manner that when the angle of deviation is 90 degrees (at the 12 o'clock position) and 270 degrees (at the six o'clock position), the number of turns is zero, and when the angle of deviation is zero degrees (at the three o'clock position) and 180 degrees (at the nine o'clock position), the number of turns is the maximum. Moreover, the magnitude of the angle of deviation at which the number of turns is the maximum is set in such a manner as to be 90 degrees apart between the sine detecting coil 21 and the cosine detecting coil 22. For example, when the angle of deviation at which the number of turns of the sine detecting coil 21 is the maximum is 90 degrees and 270 degrees, the angle of deviation at which the number of turns of the cosine detecting coil 22 is the maximum is 0 degrees and 180 degrees.

[1-3. Coils in Rotor]

Figure 6:
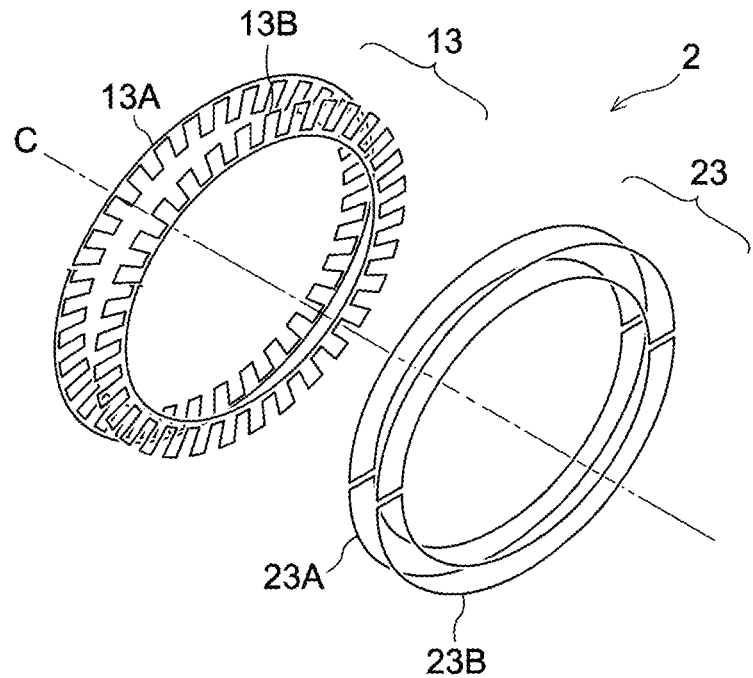
FIG. 6 is an exploded perspective view illustrative of a specific circuit structure of a rotor.
Figure 7:
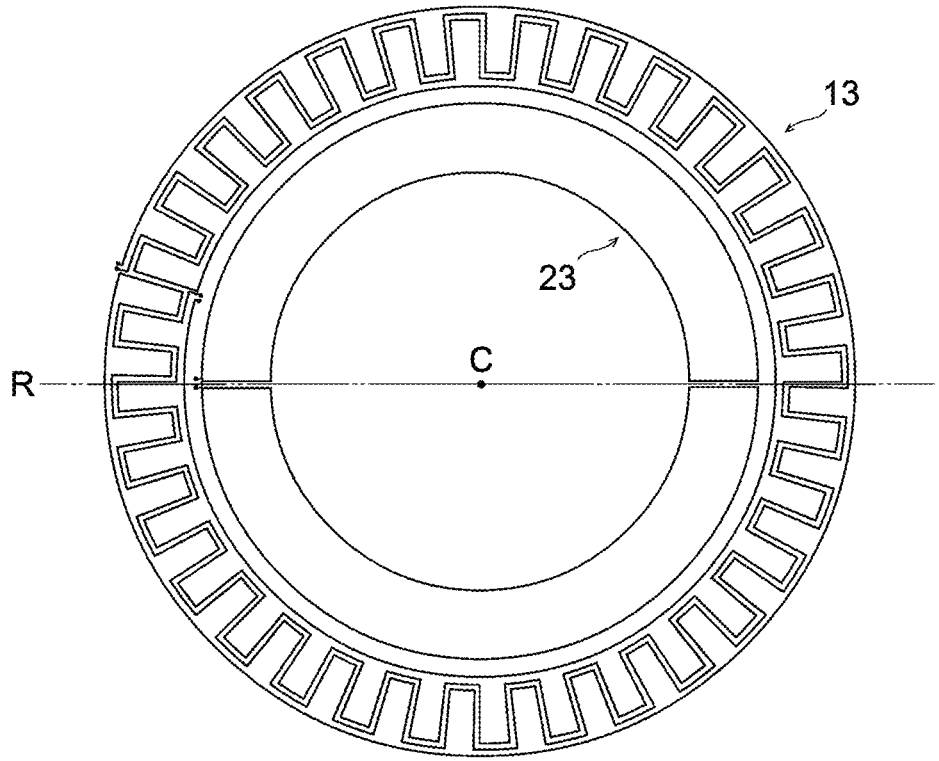
FIG. 7 is a schematic diagram of the circuit structure illustrated in FIG. 6 as viewed from the front.

FIG. 6 is an exploded perspective view illustrative of a specific circuit structure of the rotor 2. FIG. 7 is a schematic diagram of the circuit structure as viewed from the front. The detecting coil 13 and the exciting coil 23 are provided to the rotor 2 on an opposing surface between the rotor 2 and the stator 3. The exciting coil 23 is placed inside the detecting coil 13. The detecting coil 13 is placed in a ring shape, facing the sine exciting coils 11 and the cosine exciting coils 12 of the stator 3. Similarly, the exciting coil 23 is placed in a ring shape, facing the sine detecting coil 21 and the cosine detecting coil 22 of the stator 3.

The detecting coil 13 has a structure similar to that of the sine exciting coil 11 and the cosine exciting coil 12, and is placed in a ring shape at a position facing the sine exciting coils 11 and the cosine exciting coils 12. For example, the detecting coil 13 includes an annular magnetic pole group formed by placing a plurality of magnetic poles adjacently in the circumferential direction. Moreover, the detecting coil 13 is formed in a shape obtained by connecting the outward coil 13A and the return coil 13B. These outward coil 13A and return coil 13B are placed in such a manner as to not overlap with each other in an annular area as illustrated in, for example, FIG. 7. The outward coil 13A is formed in a shape obtained by placing a rectangular wave along the circumference of a circle coaxial with the rotation axis C of the rotor 2 and routing a conductor along the outer perimeter of the rectangular wave. Moreover, the return coil 13B is formed in a shape obtained by placing a rectangular wave along the circumference of a circle coaxial with the rotation axis C of the rotor 2 and routing a conductor along the inner perimeter of the rectangular wave.

As in the detecting coils 21 and 22, the number of turns of the detecting coil 13 may be changed in a sine wave shape according to the angle of deviation. For example, the number of turns and the winding form may be set in such a manner that the strength of the magnetic field generated on the detecting coil 13 changes in a sine wave shape as the angle of rotation of the rotor 2 relative to the stator 3 changes. Note that there is a tendency that as the multiplication factor of angle of the coil increases, the magnetic flux is likely to be short-circuited between adjacent magnetic poles, the magnetic field waveform is rounded, and therefore a magnetic field of which the magnitude changes in a sine wave shape automatically can be obtained. A specific magnetic field distribution shape changes depending on, for example, the magnetic pole distance, the air gap, the number of turns, and the coil shape.

The exciting coil 23 is formed in a shape obtained by connecting an outward coil 23A and a return coil 23B. The outward coil 23A and the return coil 23B are formed in a shape obtained by routing a conductor in a ring shape in each of annular areas obtained by dividing a plane where the outward coil 23A and the return coil 23B are routed into two with a given straight line R passing the rotation axis C of the rotor 2. Windings wound in the two semi-annular areas are connected together. Moreover, the winding direction of the winding wound in one of the semi-annular areas is set in a direction opposite to the winding direction of the winding wound in the other semi-annular area.

[2. Operations and Effects]

(1) In the above resolver 1, an antenna coil for transmitting the signal obtained in the detecting coil 13 as it is to the stator 3 is omitted. Moreover, the first coil group 10 having the multiplication factor of angle of nX and the second coil group 20 having the multiplication factor of angle of 1X are provided, and both of the coil groups 10 and 20 are placed in series in a signal transmission path. For example, an alternating current signal generated in the signal generator circuit 5 is transmitted to the rotor 2 via the first coil group 10 and then returned back to the stator 3 via the second coil group 20 and then into the signal processing circuit 6. In short, the first coil group 10 is used in the course of the transmission of an alternating current signal from the stator 3 to the rotor 2, and the second coil group 20 is used in the course of the transmission of the alternating current signal from the rotor 2 to the stator 3.

With such a structure, as compared to a known structure where alternating current signals generated in the signal generator circuit 5 are transmitted independently to the first coil group 10 and the second coil group 20, the number of coils can be reduced, and the inner diameter of the resolver 1 can be increased. Therefore, it is possible to promote effective use of space. Moreover, an antenna coil is omitted; therefore, as compared to the known structure, the number of layers where a conductor of a coil is routed can be reduced, and the circuit structure can be simplified. Furthermore, the number of amplifiers for excitation of an RDC (Resolver Digital Converter, resolver-to-digital converter) can be reduced from two systems to one system. The number of components of the resolver 1 can be reduced. The manufacturing cost can be reduced. Therefore, the resolver 1 of which the configuration is simple and of which the size is easily reduced can be provided.

(2) In the above resolver 1, the sine exciting coils 11 and the cosine exciting coils 12 are placed alternately and adjacently in the circumferential direction in the same plane. In this manner, the sine exciting coils 11 and cosine exciting coils 12 are formed in the same layer; therefore, the distance from the sine exciting coils 11 to the detecting coil 13 and the distance from the cosine exciting coils 12 to the detecting coil 13 can be made substantially constant, and the signal strength can be made uniform. Therefore, an excellent signal waveform can be achieved with a simple configuration.

(3) In the above resolver 1, the sine exciting coils 11, the cosine exciting coils 12, and the detecting coil 13 are provided with the outward coils 11A to 13A and the return coils 11B to 13B. These outward coils 11A to 13A and return coils 11B to 13B are placed in the same plane in such a manner as to not overlap with each other. With such a configuration, the sine exciting coils 11, the cosine exciting coils 12, and the detecting coil 13 can be achieved in one layer, and the structure can be simplified, and the thickness can be reduced.

(4) In the above resolver 1, the multiplication factor of angle of the coils included in the first coil group 10 is nX, and the multiplication factor of angle of the coils included in the second coil group 20 is 1x. With such a configuration, the phase and signal level (amplitude) of a voltage waveform induced in each of the sine detecting coil 21 and the cosine detecting coil 22 can respond to the information on the angle $\theta_{nx}$ and the angle $\theta_{1x}$. Therefore, the angle of rotation of the rotor 2 relative to the stator 3 can be easily obtained with accuracy.

[3. Modifications]

The above embodiment is a mere example. It is not intended to exclude the application of various modifications and technologies that are not specified in the embodiment. The configurations of the embodiment can be modified in various manners without departing from the gist thereof and carried out. Moreover, the configurations of the embodiment can be selected as necessary, or combined with various configurations included in known technologies as appropriate.

In the above embodiment, the sine exciting coil 11 and the cosine exciting coil 12 are placed in the shape matching the partial annular area 65 to place the sine exciting coil 11 and the cosine exciting coil 12 in the same plane. However, these coils 11 and 12 may not be placed in the same plane, and the shape of the area where the coils 11 and 12 are placed may not be the shape of the partial annular area 65. For example, it is also possible to form each of the sine exciting coil 11 and the cosine exciting coil 12 in a shape matching a completely annular area and then place the sine exciting coil 11 and the cosine exciting coil 12 in separate layers of a board, respectively.

Moreover, for example, the case where the multiplication factor of angle of the coils included in the second coil group 20 is 1× is described in detail in the above embodiment. However, instead of this, coils having a multiplication factor of angle of (n−1)X may be used. Also in such a case, an angle responsive to the multiplication factor of angle of 1× can be calculated by use of the vernier principle on the basis of a signal that is obtained from the coil having the multiplication factor of angle of nX and a signal that is obtained from a coil having the multiplication factor of angle of (n−1)X to determine the angle of rotation of the rotor 2 relative to the stator 3 and to acquire operations and effects similar to those of the above embodiment.

Moreover, in the above embodiment, the resolver 1 is illustrated by example which has the structure that excites the sine exciting coil 11 and the cosine exciting coil 12, which have the multiplication factor of angle of nX, and detects a signal with the sine detecting coil 21 and the cosine detecting coil 22, which have the multiplication factor of angle of 1×. However, the input/output relationship may be reversed. For example, the multiplication factor of angle of the coils included in the first coil group 10 may be set at 1×, and the multiplication factor of angle of the coils included in the second coil group 20 may be set at nX. In this case, the second coil group 20 having the multiplication factor of angle of nX is responsible for signal phase modulation, and the first coil group 10 having the multiplication factor of angle of 1× is responsible for signal amplitude modulation. Also in such a structure, operations and effects similar to those of the above embodiment can be acquired.

Moreover, the second coil group 20 (the sine detecting coil 21, the cosine detecting coil 22, and the exciting coil 23) of the shapes illustrated in FIGS. 3 and 6 are illustrated by example in the above embodiment. However, specific coil shapes are not limited to the above shapes. For example, the shapes of the detecting coils 21 and 22 and the exciting coil 23 may be set in such a manner that an area S of a portion where the detecting coils 21 and 22 and the exciting coil 23 overlap with each other changes in a sine wave shape according to an angle of deviation, θ, in the polar coordinate plane with reference to the rotation axis C of the rotor 2.

Figure 9:
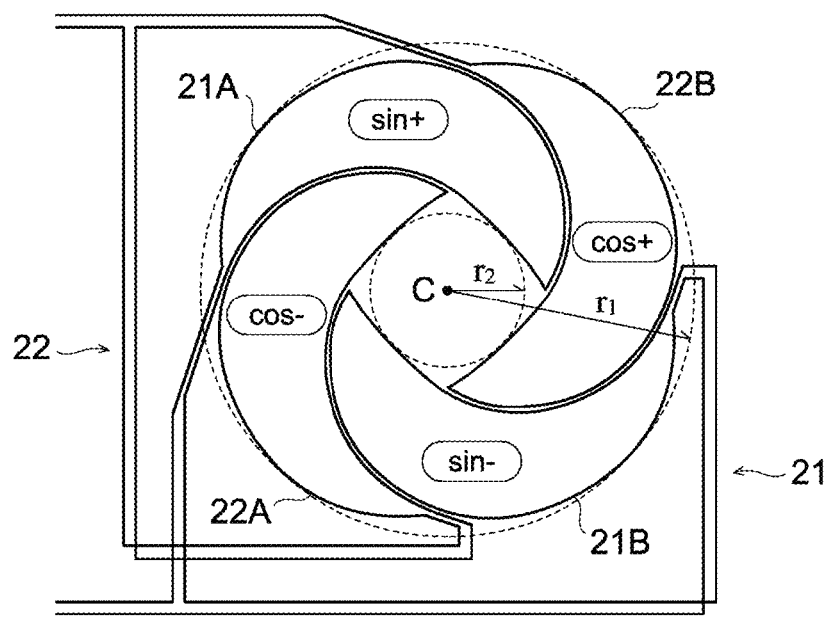
FIG. 9 is a circuit diagram illustrating the structure of an exciting coil as a modification.

The sine detecting coil 21 illustrated in FIG. 9 is formed in a shape obtained by connecting the outward coil 21A ("sin+" in FIG. 9) and the return coil 21B ("sin−" in FIG. 9). Moreover, the cosine detecting coil 22 is also formed in a shape obtained by connecting the outward coil 22A ("cos−" in FIG. 9) and the return coil 22B ("cos+" in FIG. 9). These coils 21A, 21B, 22A, and 22B are placed in the same plane in such a manner as to not overlap with each other.

Moreover, in terms of the shape of each of the coils 21A, 21B, 22A, and 22B, a curve corresponding to an outer peripheral edge is expressed in, for example, the following equation 1 in the polar coordinate plane with reference to the rotation axis C of the rotor 2, and a curve corresponding to an inner peripheral edge is expressed in, for example, the following equation 2. In this case, the area S of the portion where the sine detecting coil 21 and the cosine detecting coil 22 and the exciting coil 23 overlap with each other is expressed in the following equation 3.

[Math. 1]

$$r = (r_1 - r_2)\left\{\frac{\cos\left(\theta - \frac{3}{4}\pi\right) + 1}{2}\right\} + r_2, \ 0 \leq \theta \leq \pi \quad \text{Formula 1}$$

$$r = (r_1 - r_2)\left\{\frac{\sin\left(\theta - \frac{3}{4}\pi\right) + 1}{2}\right\} + r_2, \ 0 \leq \theta \leq \pi \quad \text{Formula 2}$$

$$S = 2\sqrt{2}\,(r_1 - r_2)^2 \cos\theta \quad \text{Formula 3}$$

$r_1$: Outer diameter, $r_2$: Inner diameter, $r$: Distance from origin $\theta$: Angle of deviation, $S$: Area In this manner, the shapes of the detecting coils 21 and 22 and the exciting coil 23 are set in such a manner that the area S of the overlapping portion of the coils 21, 22, and 23 changes in a sine wave shape. As a result, the area of a magnetic flux responsible for transmission of signals between the exciting coil 23 and the detecting coils 21 and 22 can be changed continuously (smoothly). The waveforms of alternating current signals generated in the detecting coils 21 and 22 can be smoothly curved. Therefore, an excellent signal waveform can be achieved with a simple configuration.

The invention claimed is:

1. A resolver that detects an angle of rotation of a rotor relative to a stator, the resolver comprising:

a sine exciting coil and a cosine exciting coil provided to the stator and configured to transmit alternating current signals that are 90 electrical degrees apart in phase;

a detecting coil provided to the rotor, the detecting coil being placed facing the sine exciting coil and the cosine exciting coil;

an exciting coil forming a closed circuit, together with the detecting coil, in the rotor; and a sine detecting coil and a cosine detecting coil provided to the stator, placed facing the exciting coil, and configured to transmit alternating current signals that are 90 electrical degrees apart in phase, wherein a multiplication factor of angle of the sine detecting coil, the cosine detecting coil, and the exciting coil is different from a multiplication factor of angle of the sine exciting coil, the cosine exciting coil, and the detecting coil.

2. The resolver according to claim 1, wherein the sine exciting coil and the cosine exciting coil are placed alternately and adjacently in a circumferential direction in a shared plane, each of the sine exciting coil and the cosine exciting coil has a structure of being placed in such a manner that a pair of comb-shaped closed coils connected to each other does not overlap with each other in partial annular area, and the pair of comb-shaped closed coils includes a first comb-shaped closed coil formed by routing a conductor in such a manner as to form an outline of a comb with teeth thereof extending from an arc of outer circle toward an arc of inner circle, and a second comb-shaped closed coil formed by routing a conductor in such a manner as to form an outline of a comb with teeth thereof extending from the arc of the inner circle toward the arc of the outer circle.

3. The resolver according to claim 1, wherein each of the sine exciting coil, the cosine exciting coil, the sine detecting coil, and the cosine detecting coil includes an outward coil for generating one of a magnetic pole pair, and a return coil for generating the other of the magnetic pole pair, and the outward coils and the return coils are placed in the same plane in such a manner as to not overlap with each other.

4. The resolver according to claim 1, wherein a multiplication factor of angle of the sine detecting coil, the cosine detecting coil, and the exciting coil is nX, and a multiplication factor of angle of the sine exciting coil, the cosine exciting coil, and the detecting coil is 1X.

5. The resolver according to claim 1, wherein a multiplication factor of angle of the sine detecting coil, the cosine detecting coil, and the exciting coil is nX, and a multiplication factor of angle of the sine exciting coil, the cosine exciting coil, and the detecting coil is (n−1)X.

* * * * *